United States Patent [19]
Hill et al.

[11] Patent Number: 5,394,543
[45] Date of Patent: Feb. 28, 1995

[54] KNOWLEDGE BASED MACHINE INITIATED MAINTENANCE SYSTEM

[75] Inventors: Fletcher L. Hill; Nancy R. Jurestovsky, both of Golden; David G. Beal, Longmont, all of Colo.

[73] Assignee: Storage Technology Corporation, Luoisville, Colo.

[21] Appl. No.: 40,166

[22] Filed: Mar. 30, 1993

Related U.S. Application Data

[63] Continuation of Ser. No. 650,932, Feb. 5, 1991, abandoned.

[51] Int. Cl.6 ............................................. G06F 11/00
[52] U.S. Cl. ..................................... 395/575; 371/15.1
[58] Field of Search ................... 371/29.1, 20.1, 16.5, 371/4, 15.1; 395/575

[56] References Cited

U.S. PATENT DOCUMENTS

| | | | |
|---|---|---|---|
| 3,928,830 | 12/1975 | Bellamy et al. | 371/4 |
| 4,554,661 | 11/1985 | Bannister | 371/29.1 |
| 4,972,453 | 11/1990 | Daniel, III et al. | 371/15.1 X |
| 5,090,014 | 2/1992 | Polich et al. | 371/29.1 X |

*Primary Examiner*—Robert W. Beausoliel, Jr.
*Assistant Examiner*—Ly V. Hua
*Attorney, Agent, or Firm*—Duft, Graziano & Forest

[57] ABSTRACT

The knowledge based system functions in a machine initiated maintenance environment to provide efficient and timely maintenance of customer equipment. The knowledge based system provides the failure evaluation function through the use of an expert or knowledge based system that is installed in the customer equipment. The knowledge based system makes use of a set of rules and hypotheses to operate on data collected from various points within the customer equipment to monitor the operational integrity of the customer equipment. This knowledge based system identifies the occurrence of a failure within the customer equipment and functions using its rules, hypotheses and collected data to isolate the source of the error in the customer equipment and, whenever possible, "fence" or isolate the failed field replaceable unit that has caused the error.

19 Claims, 7 Drawing Sheets

KNOWLEDGE BASED MACHINE INITIATED MAINTENANCE SYSTEM

This is a continuation divisional of application Ser. No. 07/650,932, filed Feb. 5, 1991, now abandoned.

FIELD OF THE INVENTION

This invention relates to knowledge based systems and, in particular, to a knowledge based system that is used to implement a sophisticated machine initiated maintenance capability for a plurality of equipments, each containing a number of field replaceable units.

PROBLEM

It is a problem in the field of processor controlled customer equipment to provide inexpensive and timewise efficient repair services. Sophisticated processor controlled systems typically require sophisticated failure evaluation systems to identify failed operational elements contained therein. In addition, highly skilled craftspersons are required to operate these failure evaluation systems and these craftspersons must typically be dispatched on a rush basis whenever a particular customer equipment has failed. The timely dispatch of a craftsperson is necessitated by the fact that the customer equipment represents a significant financial investment and the operation of the customer's business may be dependent on its continued operation. Therefore, numerous systems have been devised in order to detect, identify and even predict failures in sophisticated processor controlled customer equipment.

Existing failure evaluation apparatus typically perform a predetermined set of tests to identify the operational integrity of various subunits or components within the customer equipment. These failure evaluation tests are written by the manufacturer's engineers and are contained within the customer equipment when it is shipped to the customer by the manufacturer or are transported by the craftsperson to the customer site. These failure evaluation tests are either activated when a failure occurs in the customer equipment or are run in a background process on a routinely scheduled basis by the customer equipment. These failure evaluation tests typically identify that a failure has occurred and attempt to isolate the source of the failure so that the field engineer task is simplified since the failed unit is identified to a particular field replaceable unit (FRU) or a subsystem of field replaceable units. Existing failure evaluation systems also produce an alert to identify the occurrence of a failure so that the customer can request the dispatch of the field engineer. Some failure evaluation systems also contain the capability of directly communicating the failure condition to the field engineer office maintained by the manufacturer in order to bypass necessity of the customer performing this function. In all existing failure evaluation systems, the effectiveness of the system is a function of the test routine that is preprogrammed into the customer equipment. The management of the maintenance or failure evaluation systems as well as the provision of maintenance services to the customers is a very complex and expensive task.

SOLUTION

The above described problems are solved and a technical advance achieved in the field by the knowledge based system of the present invention which functions in a machine initiated maintenance environment to provide efficient and timely maintenance of customer equipment. The knowledge based system provides the failure evaluation function through the use of an expert or knowledge based system that is installed in the customer equipment. The knowledge based system makes use of a set of rules and hypotheses to operate on data collected from various points within the customer equipment to monitor the operational integrity of the customer equipment. This knowledge based system identifies the occurrence of a failure within the customer equipment and functions using its rules, hypotheses and collected data to isolate the source of the error in the customer equipment and, whenever possible, "fence" or isolate the failed field replaceable unit that has caused the error.

The failure evaluation process generates a set of data indicative of the domain node-path of functional elements for each failure that occurs in the customer equipment. A series of retry attempts are executed to attempt to successfully complete the requested operation, and each failed retry itself produces a similar set of data indicative of its associated domain node-path of functional elements. These sets of node-path data are used with the original fault symptom code, which indicates the type of problem observed, to compare the detected failure with the list of open composite failure events, indicative of all known failures in the customer equipment, to identify suspect field replaceable units. The suspect field replaceable units are likely failed units which would cause the detected failure. This process thereby correlates node-path data with associated fault symptom codes and historical failure data to isolate a single most likely failed unit in the customer equipment, independent of craftsperson intervention.

DETAILED DESCRIPTION

Figure 1:
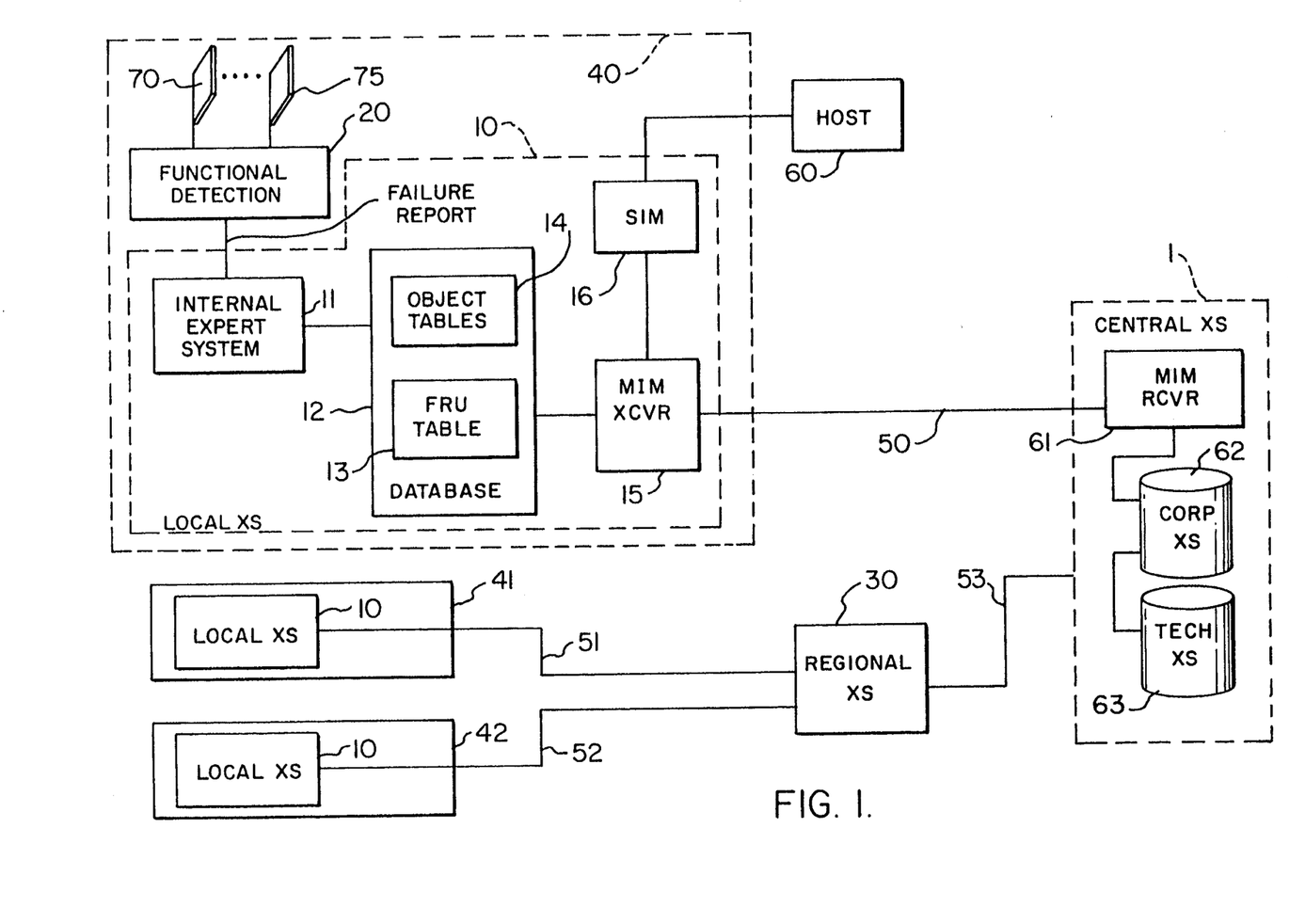
FIG. 1 illustrates the distributed hierarchical machine initiated maintenance system in block diagram

FIG. 1 illustrates in block diagram form the hierarchical distributed knowledge based machine initiated maintenance system. A plurality of customer equipment 40–42 are illustrated connected to a central maintenance system 1 via corresponding communication links 50–53. Included in each customer equipment 40 or adjunct thereto is a machine initiated maintenance system 10 which functions to communicate with central maintenance system 1 in order to provide instantaneous and efficient error identification reporting and collection. Each customer equipment 40 can be directly connected to the central maintenance system 1 or, alternatively, a plurality of customer equipment 41, 42 can be connected to a regional maintenance system 30 and a plurality of the regional maintenance systems 30 can be connected to the central maintenance system 1. The maintenance system is hierarchically arranged with local customer equipment 40–42 being serviced by its associated internal maintenance system 10 and a pool of customer equipments 41, 42 and their associated maintenance systems 10 being serviced by a corresponding regional maintenance system 30. A pool of regional maintenance systems 30 are then connected to the central maintenance system 1. The sophistication and complexity of each level of the maintenance system can be selected to correspond to economic factors, such as the installed worth of the equipment that is so maintained. Therefore, the local maintenance system 10 may be of lesser complexity than the regional maintenance system 30 since it must be replicated in each customer equipment 40. The regional maintenance system 30 can be of increased complexity since it serves a plurality of customer equipments 41–42 and views the data collected from all of these systems to thereby obtain a broader perspective on error conditions. Similarly, the central maintenance system 1 can be a sophisticated and expensive system since it serves all installed customer equipment 40–42 and supports all the regional maintenance systems 30. The central maintenance system 1 maintains records of all failures that have occurred in all customer equipment 40–42 and can therefore detect failure patterns using this data that are beyond the scope of the ability of the regional 30 or local maintenance systems 10 due to the limited pool of data available to these systems.

Customer Equipment Architecture

Customer equipment 40 is typically constructed of a plurality of field replaceable units (FRU) 70–75, each of which performs a designated, well defined function. Additional elements may be provided in customer equipment 40 that are not field replaceable units, in that a craftsperson can not simply repair or replace these elements. However, for the purpose of simplicity of description, all functional subelements contained within customer equipment 40 are designated as field replaceable units whether indeed they can be physically replaced by a craftsperson in the traditional field replaceable unit sense. The physical configuration of the customer equipment 40 is not particularly pertinent to the concept of this invention and the term field replaceable unit should not be construed as any limitation on the operational abilities of the subject system.

Within each customer equipment 40 is a number of functional detection circuits 20 that monitor the operational status of the field replaceable units (70–75) contained in customer equipment 40. The functional detection circuits 20 can be part of field replaceable units 70–75 or separate elements and consist of the error detection, diagnostic and maintenance apparatus that is well known in the art. This apparatus is not disclosed in any further detail for the purpose of simplicity. The hardware and software that comprise functional detection circuits 20 transmit a failure report to local maintenance system 10 whenever the functional detection circuits 20 determine that one or more of the hardware or software components contained within customer equipment 40 has failed.

In order to enhance the effectiveness of the failure report process, the report is formulated to reflect the customer equipment architecture which typically is a plurality of processes which operate over paths that connect nodes. Each path interconnects at least two nodes and may incorporate elements of data transmission, process control signals, or both. The nodes typically incorporate functions which exist as subsets of physical field replacement units 70–75. It is possible for a node to be contained wholly within a field replaceable unit 70–75, or on a boundary of a field replaceable unit 70–75 interfacing with a path, or as a function which spans elements of more than one field replaceable unit 70–75.

Figure 5:
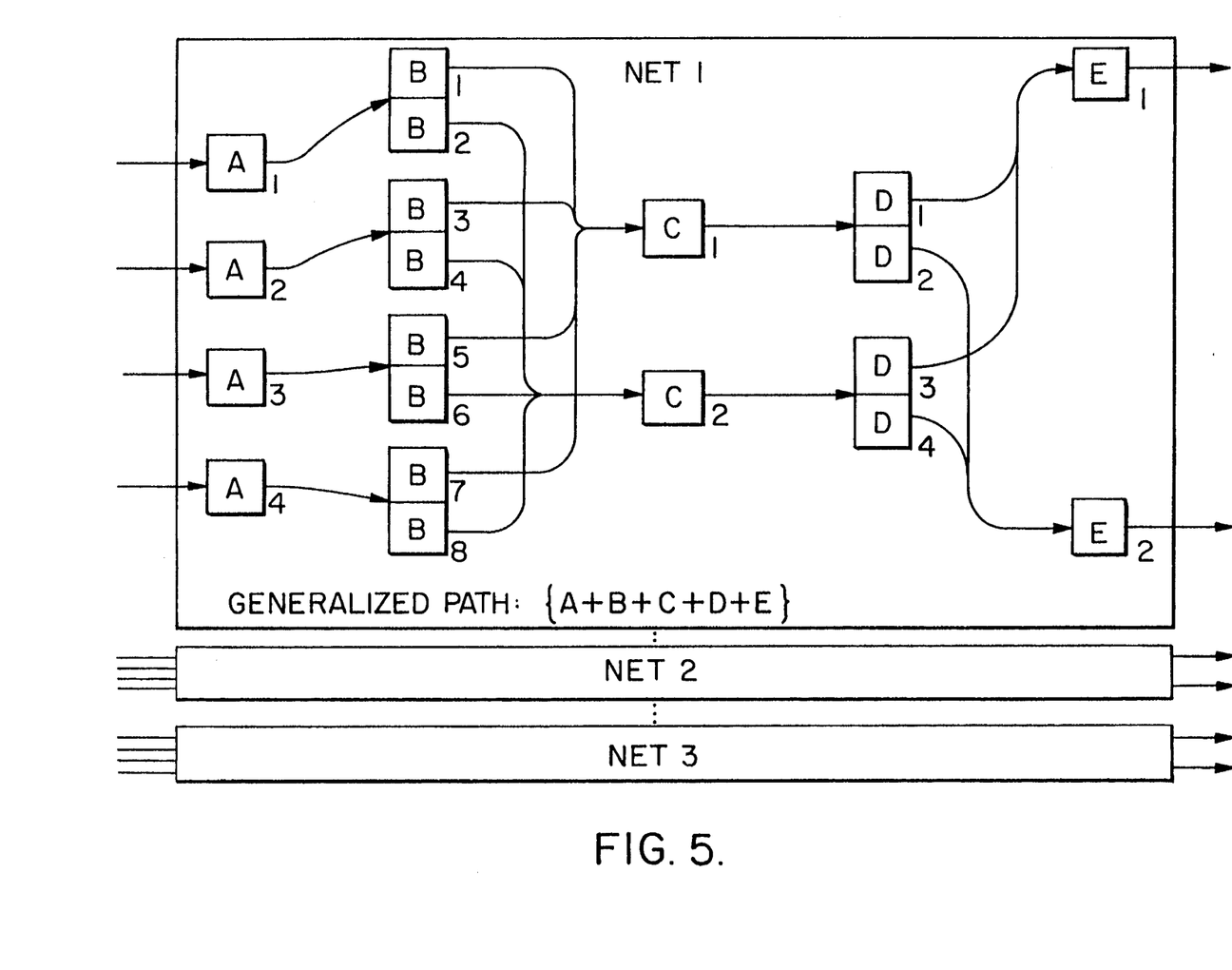
FIG. 5 illustrates the topology of the customer equipment.

In a manner analogous to the "normalization" of relational data, a composite generalized path may be described as containing all nodes necessary to describe a complete path. FIG. 5 illustrates this concept. A signal travelling from left to right through the circuit in NET 1 passes over a generalized path through the node network consisting of one node A, one node B, one node C, one node D and one node E. A generalized domain, then, is a map which shows a subset of the generalized path. Nodes B, C and D, for example, illustrate a generalized domain subset of the generalized path A, B, C, D, E.

A process, however, uses a very specific path under very specific rules. For instance, if node C1 is a controlling processor which is to obtain a complete generalized path through the equipment, it must arbitrate for or otherwise obtain a node A, then a node B which is physically linked to a node A by a path, then a path to itself, and so on. One specific domain acquired by node C1, might be Node A1, Node B1, Node C1, Node D2, Node E2.

If an operation does not require an entire generalized path, the generalized domain describes the subset of the generalized path that is used. A generalized domain consisting of Nodes A, B, C and D, then, has a specific domain which describes exactly which node A, B, C and D are in use. One such specific domain might be Node A1, Node B1, Node C1 and Node D1.

The specific domain is used to describe any set of resources in use during an operation. If Node C1 detects an error during the operation described above, valuable information is obtained when Node C1 identifies the specific domain consisting of all resources which were in use at the time of the failure, in addition to indicating any symptoms of the failure.

Local Maintenance System Architecture

Local maintenance system 10 includes an internal expert system 11 and an associated database 12 that contains a table of all errors detected by functional detection circuits 20. Also included in maintenance system database 12 is a field replaceable unit dictionary 13. This element defines the field replaceable units 70–75 contained within customer equipment 40 and their interconnection such that this data and the operational diagnostic rules can be used by expert system 11 to diagnose and isolate the system failures to a single failed field replaceable unit 70–75 in customer equipment 40. Machine initiated maintenance transceiver 15 functions to establish and maintain a data communication connection with the central maintenance system 1 via the associated communication lines 50. Machine initiated maintenance transceiver 15 also provides a link with any other local error reporting systems such as Service Information Message (SIM) system 16 connected to host computer 60.

In operation, the functional detection circuits 20 identify failures that occur within customer equipment 40. The amount of data provided by functional detection circuits 20 is a function of the complexity of this apparatus. Local maintenance system 10 receives the failure report from functional detection circuits 20, and stores this data in database 12 to create a history log of all failures in customer equipment 40. Expert system 11 analyses the failure report received from functional detection circuits 20 using the rules and hypotheses 14 programmed into internal expert system 11. Internal expert system 11 can retrieve additional data from sensor and data collection points within customer equipment 40 or can activate failure evaluation capabilities contained within customer equipment 40 in order to collect additional data concerning the operational status of customer equipment 40 as well as perform dynamic reconfiguration (fencing) in order to prove or disprove a hypothesis, or remove a field replaceable unit from operation. The rule set 14 contained within internal expert system 11 as well as the field replaceable unit dictionary 13 enable the internal expert system 11 to isolate the source of the detected error to a single or at least a small number of field replaceable units 70–75 contained within customer equipment 40. Additionally, internal expert system 11 assigns a severity level to the detected failure as an indication of the appropriate level of maintenance response for this detected error.

The processing of errors is a function of the severity level assigned to the detected errors. Errors can be simply recorded and the identified failed field replaceable unit monitored or a low level alert generated to indicate to maintenance personnel that a noncritical unit within customer equipment 40 has failed. A communication connection can be established via machine initiated maintenance transceiver 15 to the regional 30 or central maintenance facility 1 to request the immediate dispatch of repair personnel when a critical error has been detected and significantly effects the functioning of customer equipment 40.

A second function performed by internal expert system 11 is the isolation function where the failed field replaceable unit 70 is disabled, or reconfigured, or isolated within customer equipment 40. The exact manner in which this is accomplished is a function of the architecture of customer equipment 40 and the nature of the field replaceable unit 70 that failed. The isolation function can be as simple as preventing the failed field replaceable unit 70 from being accessed by the control elements of customer equipment 40.

Internal Expert System Architecture

Figure 2:
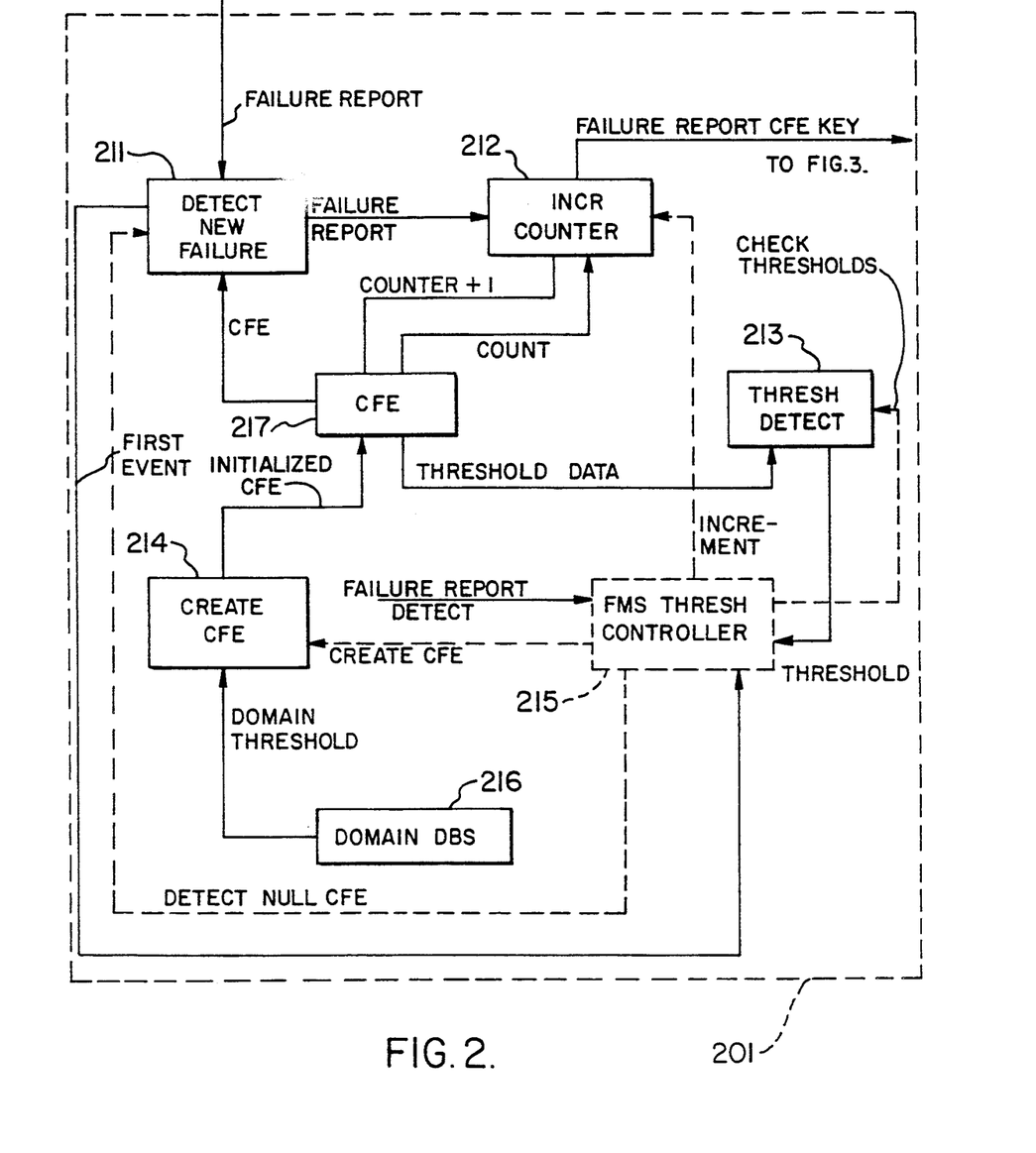
FIGS. 2 and 3 illustrate this apparatus in further detail.
Figure 3:
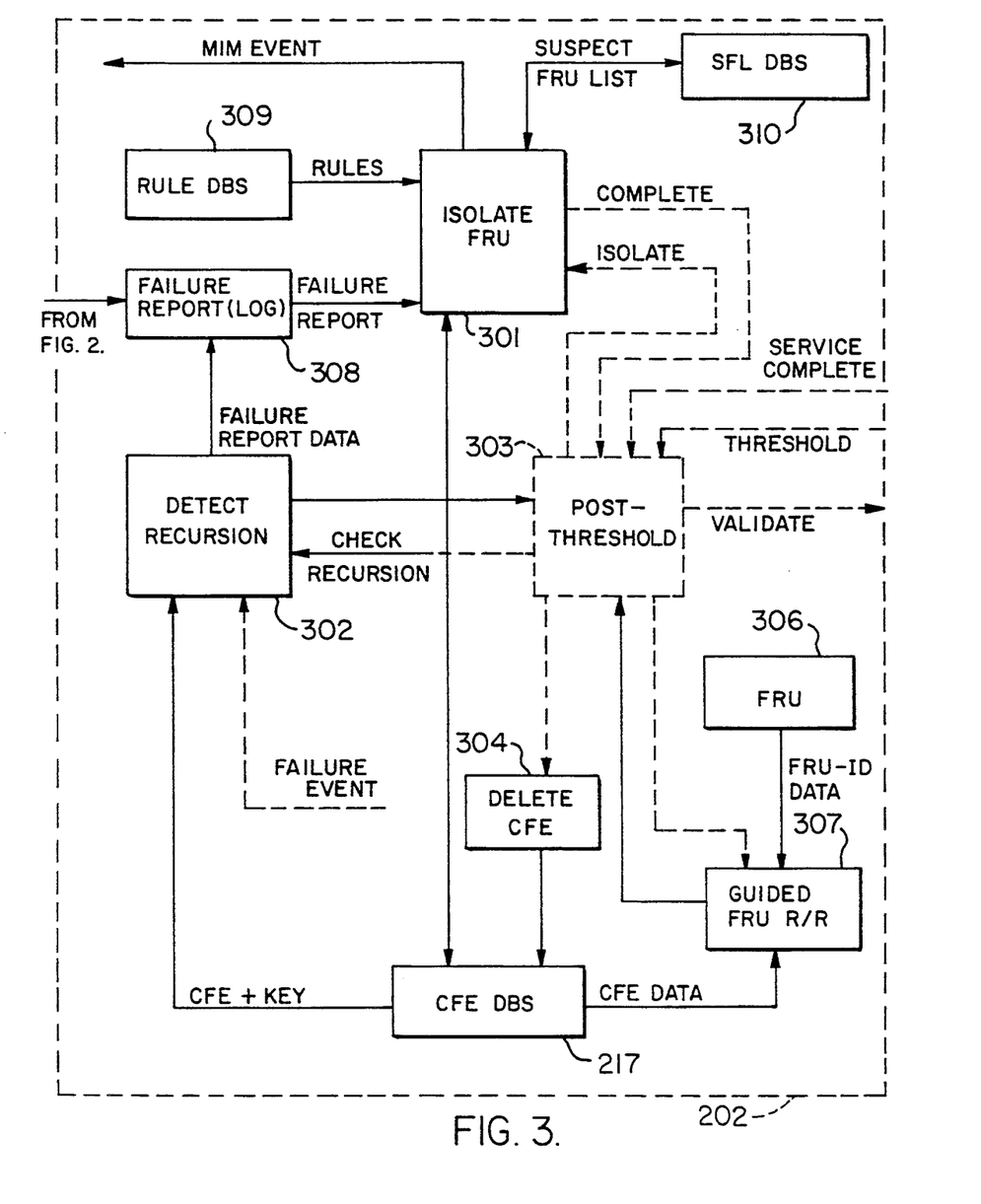

FIGS. 2 and 3 illustrate on a block diagram level the architecture of internal expert system 11. Internal expert system 11 is a special purpose expert system engine, operating in real time, which is tied to a relational/object database 12. Internal expert system 11 includes a facts database which represents the accumulated failure reports, a set of hypotheses (the suspect field replaceable unit list) and an inference engine which includes the rule and procedure execution process. This expert system can learn via recursion and rules modification. This rules database can also be modified from a remote location by either the regional expert system 30 or the central expert system 1. The architecture of the internal expert system 11 illustrated in FIGS. 2 and 3 consists of two major subportions. Prethreshold processing 201 represents the processes that are operational in internal expert system 11 prior to a fault in the associated customer equipment 40 reaching a level of criticality or a sufficient number of instances to require activation of post threshold processing 202 which represents the isolation, maintenance and recovery portion of internal expert system 11.

In this description the term failure domain is used and this term denotes the boundaries within which a given failure operates. The failure domain includes a number of aspects: physical, temporal, severity, persistence, threshold, etc. A number of repetitions of a failure may be required before the failure domain can be established with any precision. This threshold can be varied for each different failure symptom or class. It is obtained and modified empirically and shows up in the system as a new or revised object. The failure management process accrues failure information until a clear picture of the failure domain emerges. At that point a transition occurs to permit the embedded expert system process to perform isolation based on information relating to the failure domain. A composite failure event (CFE) is associated with each emerging failure domain and identifies the states that the failure domain has passed through and summarizes what is currently known about the failure domain. The prethreshold processing block 201 performs the composite failure event creation and the data accumulation.

Failure Report Structure

A multi-path architecture such as that illustrated in FIG. 5 permits a detecting processor to coordinate failure recovery within the same domain, within a partially overlapping domain, or on a totally different domain. The object of failure recovery is to complete the customer process. While doing so it is possible to gain considerable insight into a detected failure.

The failure report provides concise summary failure data from the original occurrence as well as information indicative of each recovery step taken during an attempt for customer equipment 40 to recover from the failure. Included in the failure report is a definition of the failing path and each path attempted or the successful path that was used to overcome the failure. In addition, fault symptom codes are provided for the initial event and subsequent recovery actions. Corresponding information is provided about the operation that was in progress in customer equipment 40 at the time that the failure occurred.

Within the failure domain noted above, the following components are included:
1. Physical Locale: An operation attempting to use a component bounded by the locale will result in the failure.
2. Persistence: Measure of the repeatability of the failure . Low persistence indicates transience.
3. Functional/Operational Boundary A set of functions and/or operations which result in this failure.
4. Severity: The level of degradation of s y s t e m performance which results from this failure.
5. Detectability: The symptoms by which the failure is identified.

Figure 6:
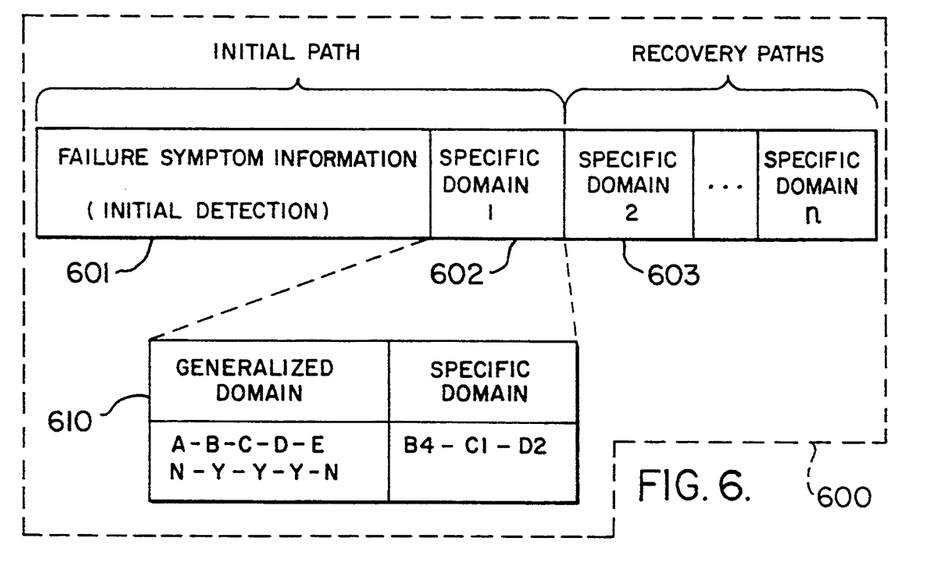
FIG. 6 illustrates a typical format of a failure report.

The detecting processor initializes a failure report 600, in which it places initial symptom data 601 and describes the specific domain 602 in operation at the time of the failure, as illustrated in FIG. 6. It then attempts to recover the operation on the same specific domain. Each recovery action increments a count corresponding to that specific domain. This activity establishes the persistence of a failure within the specific domain. If the processor completes the customer operation successfully on the original specific domain, the failure activity is complete and the failure report 600 is sent to the failure management system. If it did not successfully recover within a retry threshold, it allocates a path which is different in some respect from the original failing path and attempts recovery there. The new specific domain 603 is appended to the original failure report 601, 602. A count of the number of attempts is maintained within each specific domain field. The processor continues to vary the specific domain in use until either the operation is successful or the processor determines that recovery options are exhausted and the system cannot recover from the failure. Each specific domain variant is appended to the failure report 600 along with a count of the number of attempts on that specific domain. When either the operation succeeds or the processors give up, the failure activity is complete, and the failure report 600 is sent to the failure management system. It is possible, but not necessary, to indicate observed failure symptom variants with the domain in which they were observed. In this way, the failure report 600 is able to condense many discrete failure detections into a single informative record.

In operation, the functional detection circuits 20 detect a failure within one of field replaceable units 70-75 and produce a failure report 600 indicative of the failure that has been detected. The failure report 600 is input to the detect new failure report process 211 which compares the domain 602 and symptom 601 information of the received failure report 600 with those previously received and those for which a composite failure event has been created.

Composite Failure Event

Figure 7:
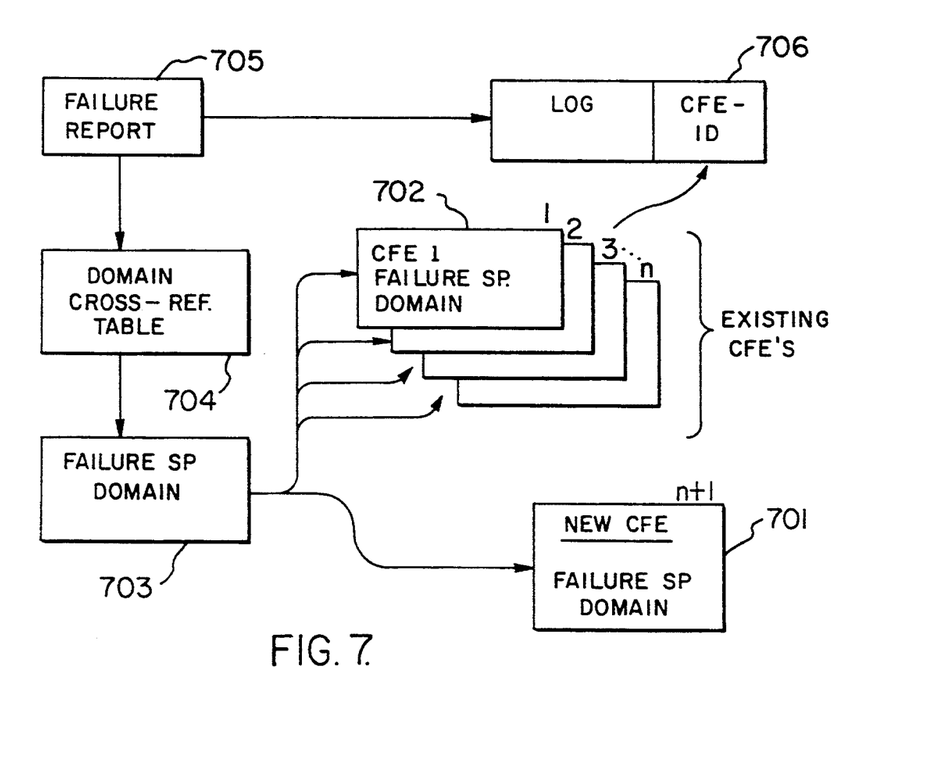
FIG. 7 illustrates the process of generating composite failure events and failure report matching.

A composite failure event 701 is formed from a failure report 705 when that failure report 705 describes a failure occurring in a specific domain which has not been observed before. The composite failure event 701 accumulates failure information to form a composite image of events which are occurring within a failure domain, and tracks the failure domain throughout its life cycle. Each composite failure event 701 is given a unique identity which is used to associate all events which may be logged, as illustrated in FIG. 7.

Figure 8:
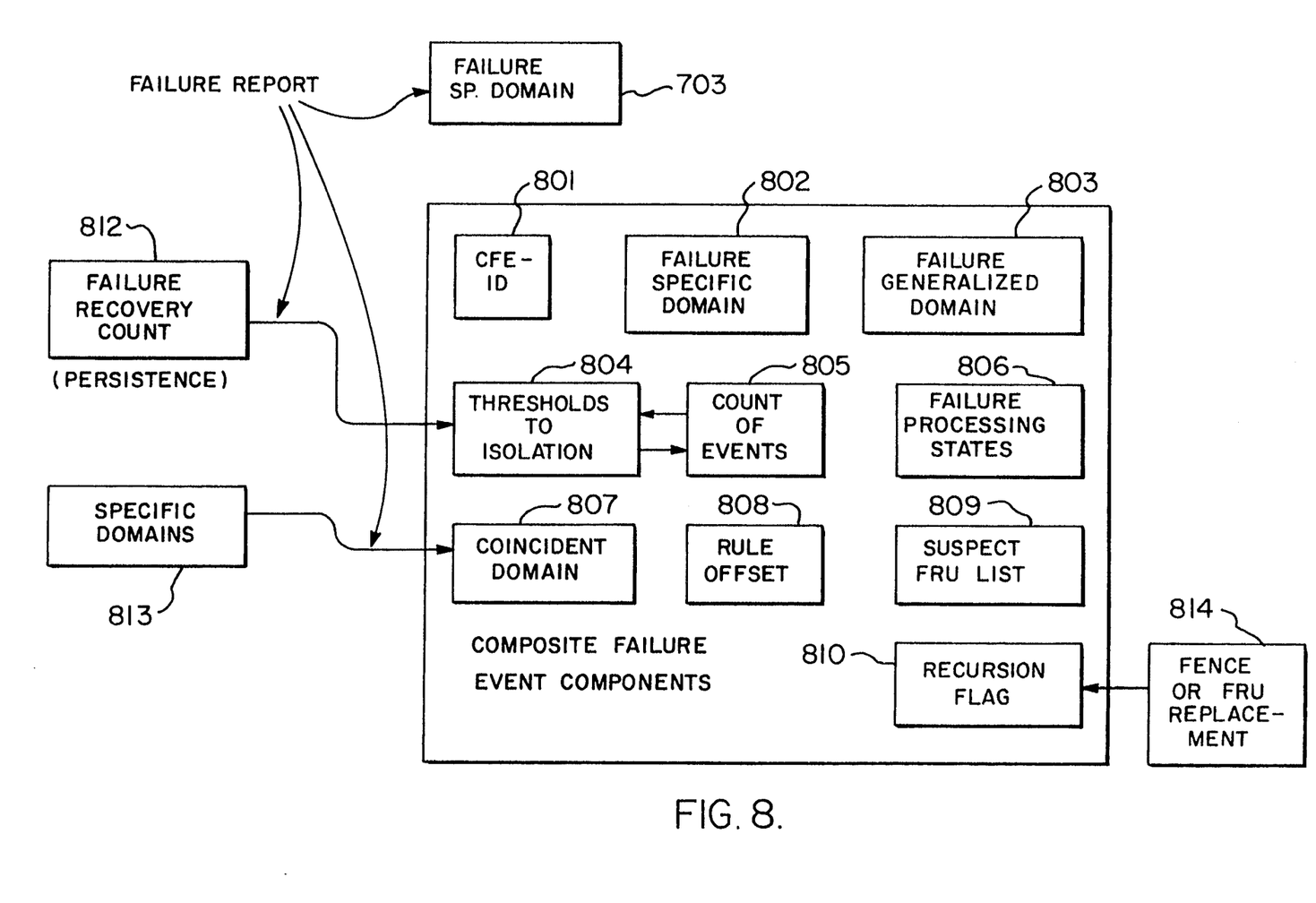
FIG. 8 illustrates the details of a typical composite failure event.

When a failure report 705 is received by the failure management system, the initial failure symptom 601 is converted to a generalized domain from domain database system 216 which indicates the paths and nodes on which that failure is typically observed. These observations are the result of collecting and analyzing empirical results within a central expert system environment. Additionally, the failure symptom is associated with a severity threshold,a persistence threshold and a characteristic impact to normal operation, also empirically obtained. It is important to note that the generalized domain 610 for the failure may be different in some particulars from the generalized domain observed during operation. Some correlation will always exist. The threshold 804 and domain 802,803 information from the initial detection are retained in the composite failure event 701.

The failure's generalized domain 610 is converted to a "failure specific domain" 802, 703 by using information embedded in the first operational specific domain 601 in the failure report. The failure specific domain 703 is then matched 704 against all failure specific domains 802 located within existing composite failure events 702. If no match is found, a failure has occurred which does not fit into the profiles of other failures which are currently being tracked. A new composite failure event 701 is created to track the new failure specific domain.

Isolation Expert System

FIG. 8 illustrates the insertion of a failure report into a composite failure event 701. Once the failure specific domain has been matched to a composite failure event specific domain, the persistence count is compared to the persistence threshold 804. If exceeded, the composite failure event 701 is sent to the isolation expert system 301 for isolation. If the persistence threshold is not exceeded, the count of events 805 is incremented to indicate the receipt of a failure report. This count is compared to the severity threshold 804. If exceeded, the composite failure event 701 is sent to the isolation expert system 301 for isolation.

Once the composite failure event 701 has been sent to the isolation expert system 301 for isolation, it is flagged so that the arrival of a subsequent failure event does not cause additional isolation.

Pre Threshold Processing

If a composite failure event has previously been created 702, the detect new failure process 211 transmits data to increment counter 212 to increment the count of failures for this designated composite failure event. The increment counter process 212 retrieves the presently stored accumulated count 805 from CFE database 217 and increments this count by one and updates this information in the CFE database 217. This updated data is then compared by threshold detector process 213 which determines whether the accumulated count of events 805 for this composite failure event has exceeded the accumulation threshold 804 that was assigned to this failure domain when the composite failure event was first created and the failure domain was inserted into the composite failure event. If the threshold is not exceeded, processing terminates. If however the threshold assigned to this particular composite failure event is exceeded, threshold detect process 213 activates threshold controller 215. Threshold controller 215 passes control to post threshold processing 303.

If the received failure report 705 can not be associated with an existing failure 702, process 211 creates a new composite failure event 701. It is accomplished by process 211 activating threshold controller 215 which creates a new composite failure event. This is accomplished by activating process 214 which is the create composite failure event process which retrieves data from the failure domain database 216 in order to create a new composite failure event. The domain data received with the failure report 705 is used to access the domain table in the domain database which supplies threshold and severity data for the composite failure event.

Post Threshold Processing

FIG. 3 illustrates the post threshold process 303 and its interaction with various databases and with the isolate field replaceable unit process 301. The post threshold processing element 303 operates in conjunction with the isolate field replaceable unit element 301 to perform the isolation processing step, including updating the suspect field replacement unit list contained in database 310 and the rule database 309. If the failure presently analyzed is a recursion event, then the detect recursion element 302 determines that this failure is a replication of priorly detected failures and adjusts the suspect FRU list 310 for the composite failure event to eliminate the FRU from consideration whose fencing or replacement caused the recursion flag to be set. This apparatus also executes the rules contained within rule database system 309 to remove as many suspect field replaceable units as possible from the suspect field replaceable unit list contained in the suspect field replaceable unit list database 310. The rules may invoke diagnostics, examine data, isolate potential failed units, in order to eliminate field replaceable units from the suspect field replaceable unit list. The goal of the process is to focus on a single likely field replaceable unit that is causing the detected failure. A guided field replaceable unit process 307 is included to interface with a craftsperson to manually replace a failed field replaceable unit and test the replacement field replaceable unit installed by the craftsperson in place of the failed unit. The isolation process executed in element 301 terminates either when there are rules left but no more field replaceable units in the suspect field replaceable unit list or when the rule action is complete.

Isolation Process

Figure 4:
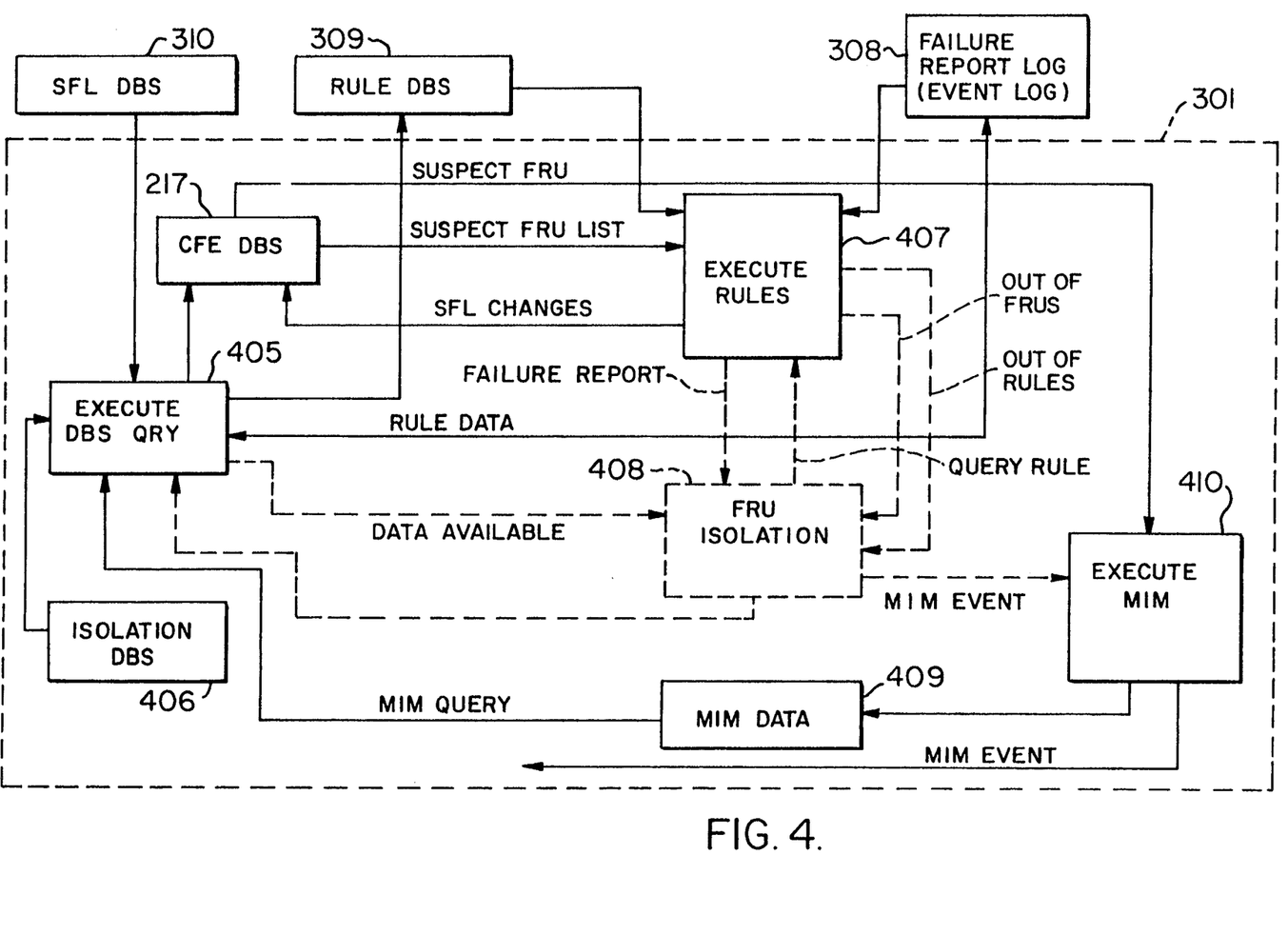
FIG. 4 illustrates additional details of the isolate field replaceable unit function.

FIG. 4 illustrates further details of the isolate field replaceable unit process 301. This process sets up the suspect field replaceable unit list using the domain identification from the composite failure event as a key and translates from the generic domain to the specific domain. The suspect field replaceable unit list is reduced by three mechanisms. First, if the composite failure event recursion trigger is set, then a member of the suspect field replaceable unit list that triggers the recursion is removed. Second, the suspect field replaceable unit list is modified by path coincidence, overlaying all paths from a number of failure reports related to this composite failure event identification. Finally, the rule set pertaining to the domain is invoked and allowed to run to completion. Rules continue to execute in process 407 even after exhaustion of the suspect field replaceable unit list since some rules are command oriented and require execution regardless of the suspect field replaceable unit list. After the rule execution is complete in process 407, the results are used to update the suspect field replaceable unit database 310, the composite failure event database 217, the failure report log 308 and the isolation database system 406.

The failure specific domain 802 contained within the composite failure event (FIG. 8) indicates all nodes which can be suspected as a cause of the failure mode represented by the composite failure event. The specific nodes can be placed within the physical field replaceable unit architecture, a process which yields a suspect FRU list 809 (SFL).

The isolation process seeks to eliminate as many suspect FRUs as possible from the suspect FRU list and rank the remaining members in order of likelihood that they caused the problem. The coincident domain 807 (FIG. 8) within the composite failure event figures strongly in this analysis, predisposing the results toward those nodes which were involved in the majority (if not all) of failure events. This may be implemented as a logical AND across all operational specific domains, or as a more sophisticated counting system in which each element of the domain is counted for each appearance.

If at any time a member of a SFL is replaced, a recursion flag 810 is set within the composite failure event (FIG. 8). If a subsequent failure occurs that falls within the failure specific domain (and hence the composite failure event), it is immediately apparent that replacement of the field replaceable unit did not resolve the failing condition. The recursion flag forces a new round of isolation to occur on the composite failure event (as described above) after first eliminating the replaced member of the SFL from consideration. The result is a new SFL with a new ranking.

When a member of the SFL is replaced the composite failure event is placed in an interim closure state, in addition to setting the recursion flag. This state is maintained for a predetermined length of time which is sufficient to ensure that the failure has been resolved. At the expiration of the interim closure interval the composite failure event is placed in a closure state, at which time it is logged and eliminated from active comparison with new failure reports.

Human Input

Human input to the expert systems is allowed at any level, since it will be propagated to all levels through system interaction. It occurs in response to Machine Initiated Maintenance events 410.

The MIM event may reveal one or more Suspect FRUs, or no Suspect FRUs at all. The former case requires FRU change interaction; the latter case is known as an Engineering Alert MIM because it typically involves central expert system and engineering resources to assist in problem resolution.

The unique identity of the composite failure event is also contained in the MIM event, and provides a problem reference which is used by the craftsperson when replacing FRUs to resolve the MIM.

Where one or more Suspect FRUs are indicated in the MIM, the craftsperson invokes an interactive dialogue called Guided FRU Replacement 307, or GFR. The craftsperson uses GFR 307 to select the composite failure event identity for which the MIM was sent, and selects the FRU to be replaced from the SFL that is continued in the composite failure event. GFR 307 in turn initiates fencing at the required level so that the FRU can be replaced without removing subsystem power, and encourages the craftsperson to proceed with the replacement. GFR confirms the replacement and invokes a series of validation diagnostics which test the FRU in isolation. On successful completion, GFR places the FRU in a closely-monitored functional operation with the craftsperson present. Following this, GFR sets the recursion flag (810) in the composite failure event, and alters the state (806) of the composite failure event to reflect an initial closure of the event.

All diagnostic and FRU change information is captured in the failure report log 308, which also contains the underlying failure reports. As with the failure reports, diagnostic and FRU change information are keyed with the composite failure event's unique identity. This permits internal or external reconstruction of the problem.

In some cases, however, the local expert system 11 is unable to identify the cause of the problem with any certainty: that occurs, for instance, when there are no suspect FRU list members. This can result from an incorrect diagnosis, faulty FRU replacement technique on the part of the craftsperson, a class of customer replaceable unit defect which permeates a population of a given FRU, or from certain software defects. In all of these cases, the isolation engine 301 is unable to arrive at an SFL and dispatches an Engineering Alert MIM.

The Engineering Alert MIM is directed to the MIM Receiver (61), which reviews the information received from the local expert system 11 and validates its rule set based on current universal knowledge. If the technical expert system 63 is aware of a recent solution (such as a software release which fixed a defect), it propagates that information downwards. Otherwise it alerts central engineering expertise that human assistance is required. In this way engineering resources may be concentrated on the class of problems that are new or out of the scope of accumulated expertise. Technical expert system (63) also suggests courses of action based on problem sources which are known to be excluded or non-contributing to a problem.

When the problem resolution is discovered it is conveyed in the form of new rules and hypotheses to the technical expert system 63 by the engineer. All subordinate systems which are afflicted with the failure are scheduled by the central system to receive the resolution.

An additional level of analysis is provided by the corporate expert system (62). It evaluates failure trends and FRU reliability. It applies the same method of composite failure event creation and isolation to evaluate failure within FRUs, at the component level. It evaluates across the broad spectrum of available failure information, using more explicit domain information to trace paths within FRUs. It matches its predictions against results obtained by post-mortem examination of returned FRUs, and issues an alert when a component exceeds reliability standards. The system may discriminate among those component failures which are universal to the component and those component failures which appear only in certain applications.

Human interaction with this system is provided at a level analogous to GFR, in which the system guides the reliability engineer in his evaluation of a failed FRU, and the reliability engineer responds with his observations.

While a specific embodiment of this invention has been disclosed, it is expected that those skilled in the art can and will design alternate embodiments of this invention that fall within the scope of the appended claims.

I claim:

1. A machine initiated maintenance apparatus connected to and colocated with a customer system for identifying failed field replaceable units in said customer system, which customer system includes a plurality of field replaceable units, each of which contains at least one operational element thereon, comprising:

means for detecting the presence of a failure in said customer system;

means for generating a failure report which contains data relevant to said detected failure, including an identification of the failure mode and all operational elements on all field replaceable units that were cooperatively operative during said detected failure;

means for storing said failure report;

means for maintaining a failure analysis history containing data identifying each of said field replaceable units and associated composite failure data representative of known field replaceable unit failures;

means for comparing, substantially contemporaneously with occurrence of said failure, said stored failure report with said failure analysis history;

means for identifying at least one failed field replaceable unit based on said comparison.

2. The apparatus of claim 1 wherein said comparing means includes:

means for generating a list of said elements which are common to a plurality of said failure reports;

means for mapping said listed elements to at least one field replaceable unit containing said listed elements.

3. The apparatus of claim 2 wherein said identifying means includes:

means for prioritizing said at least one field replaceable unit to identify a most likely failed field replaceable unit.

4. The apparatus of claim 3 further including:

means, responsive to the replacement of said identified most likely failed field replaceable unit and the subsequent reoccurrence of said detected failure within a predetermined period of time, for identifying a new most likely failed field replaceable unit.

5. The apparatus of claim 1 further comprising:

means, responsive to said stored failure report, for producing a failure severity indication which denotes the impact of said detected failure on said customer system.

6. The apparatus of claim 1 further comprising:

means, responsive to said stored failure report, for producing a failure persistence indication which denotes the difficulty required to remedy said detected failure.

7. The apparatus of claim 1 further comprising:

means, responsive to said detected failure, for activating said customer system to retry the operation active during said detected failure to determine the persistance of said detected failure.

8. The apparatus of claim 7 wherein said activating means repeatedly activates said customer system until said operation is successful or a predetermined number of attempts are initiated.

9. The apparatus of claim 1 further including:

means responsive to said comparing means failing to match said generated failure report with said composite failure data in said failure analysis history for producing a new composite failure data representative of said generated failure report;

means for appending said produced composite failure data to said failure analysis history.

10. A machine initiated maintenance apparatus connected to and colocated with a customer system for identifying failed field replaceable units in said customer system, which customer system includes a plurality of field replaceable units, each of which contains at least one operational element thereon, comprising:

means for detecting the presence of a failure in said associated customer system;

means for generating a failure report which contains data relevant to said detected failure, including an identification of the failure mode and all operational elements on all field replaceable units that were cooperatively operative during said detected failure;

means for storing said failure report;

means for maintaining a failure analysis history containing data identifying each of said field replaceable units and associated failure data;

means for comparing, substantially contemporaneously with occurrence of said failure, said stored failure report with said failure analysis history, including:
　means for generating a list of said elements which are common to a plurality of said failure reports,
　means for mapping said listed elements to at least one field replaceable unit containing said listed elements,
means for identifying at least one failed field replaceable unit based on said comparison, including:
　means for prioritizing said at least one field replaceable unit to identify a most likely failed field replaceable unit;
means, responsive to the replacement of said identified most likely failed field replaceable unit and the subsequent reoccurrence of said detected failure within a predetermined period of time, for identifying a new most likely failed field replaceable unit;
means, responsive to said stored failure report, for producing a failure severity indication which denotes the impact of said detected failure on said customer system;
means, responsive to said stored failure report, for producing a failure persistence indication which denotes the difficulty required to remedy said detected failure;
means, responsive to said detected failure, for activating said customer system to retry the operation active during said detected failure to determine the recursiveness of said detected failure;
means responsive to said comparing means failing to match said generated failure report with said composite failure data in said failure analysis history for producing a new composite failure data representative of said generated failure report;
means for appending said produced composite failure data to said failure analysis history.

11. In a machine initiated maintenance apparatus connected to and colocated With a customer system, a method of identifying failed field replaceable units in said customer system, which customer system includes a plurality of field replaceable units, each of which contains at least one operational element thereon, comprising the steps of:
　detecting the presence of a failure in said associated customer system;
　generating a failure report which contains data relevant to said detected failure, including an identification of the failure mode and all operational elements on all field replaceable units that were cooperatively operative during said detected failure;
　storing said failure report;
　maintaining a failure analysis history containing data identifying each of said field replaceable units and associated composite failure data representative of known field replaceable unit failures;
　comparing, substantially contemporaneously with occurrence of said failure, said stored failure report with said failure analysis history;
　identifying at least one failed field replaceable unit based on said comparison.

12. The method of claim 11 wherein said step of comparing includes:
　generating a list of said elements which are common to a plurality of said failure reports;
　mapping said listed elements to at least one field replaceable unit containing said listed elements.

13. The method of claim 12 wherein said step of identifying includes:
　prioritizing said at least one field replaceable unit to identify a most likely failed field replaceable unit.

14. The method of claim 13 further including the step of:
　identifying, in response to the replacement of said identified most likely failed field replaceable unit and the subsequent reoccurrence of said detected failure within a predetermined period of time, a new most likely failed field replaceable unit.

15. The method of claim 11 further comprising the step of:
　producing, in response to said stored failure report, a failure severity indication which denotes the impact of said detected failure on said customer system.

16. The method of claim 11 further comprising the step of:
　producing, in response to said stored failure report, a failure persistence indication which denotes the difficulty required to remedy said detected failure.

17. The method of claim 11 further comprising the step of:
　activating, in response to said detected failure, said customer system to retry the operation active during said detected failure to determine the recursiveness of said detected failure.

18. The method of claim 17 wherein said step of activating repeatedly activates said customer system until said operation is successful or a predetermined number of attempts are initiated.

19. The method of claim 11 further including the steps of:
　producing, in response to failing to match said generated failure report with said composite failure data in said failure analysis history, a new composite failure data representative of said generated failure report;
　appending said produced composite failure data to said failure analysis history.

* * * * *